United States Patent
Kim et al.

(10) Patent No.: US 7,092,325 B2
(45) Date of Patent: Aug. 15, 2006

(54) METHOD OF ARRANGING OPTICAL PICKUP SYSTEM AND OPTICAL RECORDING AND/OR REPRODUCING APPARATUS HAVING THE ARRANGED OPTICAL PICKUP SYSTEM

(75) Inventors: Bong-gi Kim, Gyeonggi-do (KR); Chun-seong Park, Gyeonggi-do (KR); Soo-han Park, Gyeonggi-do (KR); Moon-whan Lee, Gyeonggi-do (KR); Hyo-chan Lee, Seoul (KR); Jong-uk Kim, Gyeonggid-do (KR); Seong-su Park, Gyeonggi-do (KR); Tae-youn Heor, Gyeonggi-do (KR); Do-hoan Nam, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 10/460,655

(22) Filed: Jun. 13, 2003

(65) Prior Publication Data

US 2004/0032804 A1    Feb. 19, 2004

(30) Foreign Application Priority Data

Jun. 14, 2002 (KR) ............................... 2002-33398
Apr. 22, 2003 (KR) ..................... 10-2003-0025530

(51) Int. Cl.
*G11B 7/00* (2006.01)

(52) U.S. Cl. .............................. 369/44.37; 369/112.03; 369/44.41

(58) Field of Classification Search ..................... None
See application file for complete search history.

(56) References Cited

U.S. PATENT DOCUMENTS 6,044,048 A    3/2000    Oinoue et al.

(Continued)

FOREIGN PATENT DOCUMENTS

EP    874 358    10/1998

(Continued)

OTHER PUBLICATIONS

Korean Office Action dated Mar. 29, 2005 cited in corresponding Korean Patent Application No. 10-2003-0025530.

(Continued)

*Primary Examiner*—Muhammad Edun
(74) *Attorney, Agent, or Firm*—Staas & Halsey LLP

(57) ABSTRACT

A method of arranging an optical pickup system on a deck of an optical recording and/or reproducing apparatus, which enables detection of a tracking error signal using one photodetector based on a three-beam method and by a differential phase detection method. The optical pickup system includes a light source, a diffractive optical element which diffracts a light beam incident from the light source and splits the same into at least three beams, a plate-type beam splitter which changes a propagation path of the light beam, and a photodetector including at least one main photodetector having at least four sections and a plurality of sub-photodetectors. The optical pickup system is constructed so as to have a reflecting mirror redirect the propagation path of the light beam emitted from the light source toward a recording medium. The method of arranging the optical pickup includes, where the propagation path of the light beam transmitted through the plate-type beam splitter to the photodetector is an optical path axis, arranging the optical pickup system so as to have the optical path axis tilted with respect to an axis in a tangential direction of the recording medium and have the photodetector placed away from a rotation center of a motor that rotates the recording medium, and selectively optimizing the arrangement of the photodetector to detect a tracking error signal by the differential phase detection method.

24 Claims, 13 Drawing Sheets

U.S. PATENT DOCUMENTS 6,256,285 B1 * 7/2001 Coombs ................ 369/112.03
6,594,221 B1 * 7/2003 Ogasawara ............ 369/112.19
2001/0026525 A1   10/2001 Takahashi

FOREIGN PATENT DOCUMENTS

| EP | 1 047 051 | 10/2000 |
|---|---|---|
| EP | 1 304 690 | 4/2003 |
| JP | 62-060141 | 3/1987 |
| JP | 05-159338 | 6/1993 |
| JP | 5-298731 | 11/1993 |
| JP | 09-204676 | 8/1997 |
| JP | 2000-090476 | 3/2000 |
| JP | 2001-167471 | 6/2001 |

OTHER PUBLICATIONS

Japanese Office Action issued Feb. 1, 2006, in Japanese Patent Application No. 2003-169950 which corresponds to the U.S. Patent Application No. 10/460,655.

* cited by examiner

PIT DEPTH

US 7,092,325 B2

METHOD OF ARRANGING OPTICAL PICKUP SYSTEM AND OPTICAL RECORDING AND/OR REPRODUCING APPARATUS HAVING THE ARRANGED OPTICAL PICKUP SYSTEM

CROSS-REFERENCE TO RELATED APPLICATIONS

This application claims the benefit of Korean Patent Application Nos. 2002-33398, filed Jun. 14, 2002 and 2003-25530, filed Apr. 22, 2003, the disclosures of which are incorporated herein by reference.

BACKGROUND OF THE INVENTION

1. Field of the Invention

The present invention relates to a method of arranging an optical pickup system and an optical recording and/or reproducing apparatus having the arranged optical pickup system.

2. Description of the Related Art

FIG. 1 shows an example of the optical configuration of an optical pickup. Referring to FIG. 1, the optical pickup includes a light source 3 which emits light of a predetermined wavelength, a plate-type beam splitter 5 which changes a propagation path of a light beam emitted by the light source 3, an objective lens 7 which focuses an incident light beam to a spot on a recording surface of an optical disc 1, and a photodetector 9 which detects an information signal and an error signal by receiving the light beam that is reflected from the recording surface of the optical disc 1 and has sequentially passed through the objective lens 7 and the plate-type beam splitter 5. The optical pick-up, as shown in FIG. 4, is arranged such that all components of the optical pickup system, except for the objective lens 7, are approximately parallel to the optical disc 1 by redirecting the optical path by 90 degrees with a reflecting mirror 2. In FIG. 1, reference numerals 4, 6, and 8 refer to a grating, a collimating lens, and a concave lens.

The grating 4 is disposed between the light source 3 and the plate-type beam splitter 5 to diffract the light beam emitted from the light source 3 into $0^{th}$-order and $\pm 1^{st}$-order beams, so as to detect a tracking error signal by a three-beam method.

FIG. 2 illustrates that in a normal state, a main light beam corresponding to the $0^{th}$-order diffracted light beam passing through the grating 4 is focused on a main track 1a as a main light beam spot S0, while sub-beams corresponding to the $\pm 1^{st}$-order beams diffracted by the grating 4 are centered as sub-beam spots S1 and S2 approximately symmetrical to radial and tangential directions relative to the main light beam spot S0, on positions slanted with respect to the main track 1a. The main light beam is reflected/diffracted from the optical disc 1 to produce a reflected/diffracted light beam which will be described later. In FIG. 2, a dotted line is used to distinguish one track from another.

Where the grating 4 is provided to detect a tracking error signal by the three-beam method, the photodetector 9 may comprise a main photodetector and a pair of sub-photodetectors to detect a main light beam and sub-beams reflected from the optical disc 1, respectively. The collimating lens 6 is disposed between the plate-type beam splitter 5 and the objective lens 7 so as to convert a divergent light beam emitted from the light source 3 into a parallel light beam. The concave lens 8 is positioned between the plate-type beam splitter 5 and the photodetector 9 to spread out a light beam focused on the photodetector 9. The concave lens 8 is inclined in a direction opposite to the direction in which the plate-beam splitter 5 is tilted so as to remove coma aberrations on a light beam passing through the plate-type beam splitter 5.

In the optical pickup described above, the light beam emitted from the light source 3 is reflected by the plate-type beam splitter 5 and proceeds toward the optical disc 1, and the light beam reflected from the optical disc 1 transmits through the plate-type beam splitter 5 and travels to the photodetector 9. Hereinafter, an axis of propagation path of the light beam transmitted through the plate-type beam splitter 5 to the photodetector 9 is called an optical path axis c.

FIG. 3 illustrates that since the plate-type beam splitter 5 is tilted with respect to the optical path axis c, an optical length in a horizontal direction h of the light beam transmitted through the plate-type beam splitter 5 remains constant regardless of an incident location of the light beam on the beam splitter 5, while an optical length in a vertical direction v varies depending on the location. This causes astigmatism due to difference in focal points in the horizontal and vertical directions h and v. Here, an axis in the vertical direction v is one axis, i.e., a major axis of an oval light beam suffering from astigmatism, and an axis parallel to the vertical axis is an astigmatism axis.

Thus, the optical pickup of FIG. 1 arranged so that the light beam reflected from the optical disc 1, which is transmitted through the plate-type beam splitter 5 to the photodetector 9, can detect a focus error signal using an astigmatism induced in the light beam transmitted through the plate-type beam splitter 5.

A motor (not shown) to rotate the optical disc 1 and an optical pickup system are mounted on a deck of an optical recording and/or reproducing apparatus, such as a disc driver or a disc player, to record and/or reproduce information on and/or from the optical disc 1, using light. Since the size of the deck affects the overall size of the optical recording and/or reproducing apparatus, a particular arrangement of the optical pickup system with respect to the deck is very important, for example, in making the optical recording and/or reproducing apparatus compact.

In the case of detecting a focus error signal by an astigmatism method using the plate-type beam splitter 5 as an optical path changer instead of a separate astigmatism lens, as shown in FIG. 1, the photodetector 9 is necessarily oriented at 45 degrees to detect the focus error signal by the astigmatism method, where the optical pick system is arranged so as to have the optical path axis c parallel to a tangential direction. Here, the tangential direction refers to a direction of a series of pits or marks formed along a track on the optical disc 1.

To detect a focus error signal by an astigmatism method, as well as a tracking error signal by a three-beam method, the photodetector 9 includes a main photodetector having four or more sections, and a pair of sub-photodetectors on either side thereof. Where the photodetector 9 rotates at 45 degrees to detect a focus error signal by an astigmatism method, using astigmatism occurring at the plate-type beam splitter 5, sub-beams used to detect the tracking error signal by the three-beam method may not be received by the sub-photodetectors. Rather, the sub-beams deviate from the sub-photodetectors.

Thus, where the photodetector 9 rotates at 45 degrees, it is not possible to detect a tracking error signal by the three-beam method since the sub-beams are not received onto the sub-photodetectors. Furthermore, this eventually increases the space required to mount the photodetector 9 on the deck of an optical recording and/or reproducing apparatus since a height needed to install the photodetector 9 corresponds to a length of a diagonal line of the photodetector 9.

To solve these problems, where the optical pick-up system includes the plate-type beam splitter 5 on the deck of the optical recording and/or reproducing apparatus and is arranged to two-dimensionally arrange all components of the optical pickup system, except the objective lens 7, approximately parallel to the optical disc 1 by redirecting an optical path by 90 degrees with the reflecting mirror 2, the optical pickup system is necessarily arranged so as to have the optical path axis c inclined at 45 degrees with respect to a tangential direction. Here, the tangential direction perpendicular to the radial direction refers to a direction of a series of pits or marks formed on the optical disc 1.

However, it is difficult to arrange the optical pickup system so as to have the optical path axis c be tilted relative to the tangential direction by 45 degrees due to the size of a motor mounted on the deck to rotate the optical disc 1. In general, the optical path axis c is inclined at an angle of less than 35 degrees relative to the tangential direction to avoid contact with the motor.

For at least the reasons provided above, as shown in FIG. 4, in a conventional method, an optical pickup system is arranged so as to have an optical path axis c1 inclined with respect to a tangential direction at a predetermined angle E, for example, 35 degrees, and a photodetector 9 is placed at a location close to a rotation center Mc of a motor (not shown) mounted on a deck that rotates an optical disc 1.

Reference numeral 2 in FIG. 4 refers to a reflecting mirror that redirects a proceeding path of a light beam emitted from a light source 3 toward the optical disc 1.

Since the optical pickup system is arranged so as to have an angle of the optical path axis c1 relative to the tangential direction less than 45 degrees, for example, 35 degrees, the photodetector 9 comprises, as shown in FIG. 5, a main photodetector 9a that is split into four sections by lines d1 and d2 having oblique 5–10 degrees with respect to axes of tangential direction and radial direction, respectively, and a pair of sub-photodetectors 9b and 9c.

In FIGS. 5, 7, and 8A–8C, an axis of the tangential direction can correspond one-to-one to a tangential direction on the optical disc 1, while an axis of the radial direction can correspond one-to-one to a radial direction on the optical disc 1.

The use of an optical pickup system arranged as shown in FIG. 4 and a photodetector constructed as shown in FIG. 5 achieves the same effect as when using a typically split photodetector for the photodetector 9 and rotating the photodetector at 45 degrees. Here, the typically split photodetector refers to a photodetector in which a main photodetector is split to be rectangular or square.

In FIG. 4, θ refers to an angle between the optical path axis c1 and the axis in the tangential direction. The optical path axis c1 forms an angle 90°-θ with the axis in the radial direction that transverses through the rotation center Mc of the motor mounted on the deck that rotates the optical disc 1.

As shown in FIG. 4, where the photodetector 9 is placed toward the rotation center Mc of the motor, the light source 3 is placed at a location farther away from the rotation center Mc than the photodetector 9 since it is not possible to position the light source 3 near the rotation center Mc due to space restrictions. The use of an optical pickup system arranged as shown in FIG. 4 and a photodetector constructed as shown in FIG. 5 allows detection of a focus error signal by an astigmatism method employing astigmatism that occurs at the plate-type beam splitter 5 used as an optical path changer, as well as detection of a tracking error signal by a three-beam method.

Thus, the conventional method of arranging the optical pickup facilitates detection of a tracking error signal by a three-beam method while making an optical recording and/or reproducing apparatus compact by reducing the space required to install the optical pickup system, as compared to a case of arranging the optical pickup system so that the optical path axis c1 is parallel to an axis of a tangential direction.

The problem with the conventional method of arranging the optical pickup system (so that the optical path axis c1 is tilted relative to the axis of the tangential direction and the photodetector 9 is placed near the rotation center Mc of the motor) arises where a single photodetector is used to detect a tracking error signal by a differential phase detection (DPD) method and a tracking error signal by a three-beam method.

CD and DVD compatible optical pickups having a single light source and a single photodetector, or having two light sources and a single photodetector, require detection of tracking error signals using both DPD and three-beam methods.

Typically, in the case of CDs, a tracking error signal detected by the three-beam method is used to perform a tracking control, whereas in DVDs, a tracking error signal detected by the DPD method is used to do the same.

However, the conventional method of arranging the optical pickup system makes it difficult to detect tracking error signals by both DPD and three-beam methods using a single photodetector based on the following aspects.

FIG. 6 illustrates that where a light beam spot is formed in a pit P (or a mark) on the optical disc 1, diffraction occurs in an edge of the pit P. Thus, as shown in FIG. 7, a light beam reflected/diffracted from the pit P on the optical disc 1 has a structure in which a $0^{th}$-order diffracted beam Lm and $\pm 1^{st}$-order diffracted beams Ls generated by diffraction on the edge of the pit P partially overlap each other. In FIG. 7, a main light beam corresponding to the $0^{th}$-order beam and sub-beams corresponding to the $1^{st}$-order beams diffracted by the grating 4 have a partially overlapped structure since those light beams are reflected from the optical disc 1 and diffracted by the pit P. However, a reflected/diffracted light beam used to detect a tracking error signal by a DPD relates to the main light beam. Accordingly, only the reflected/diffracted light beam for the main light beam will be described hereinafter.

FIG. 7 shows a reflected/diffracted light beam (the reflected/diffracted light beam before entering the plate-type beam splitter 5) that passes through the objective lens 7 and travels toward the collimating lens 6. FIGS. 8A and 8B show the reflected/diffracted beam transmitted through the plate-type beam splitter 5. That is, FIG. 8A shows the optical path axis c1 and reflected/diffracted light beam when viewed facing the plate-type beam splitter 5, while FIG. 8B shows the optical path axis c1 and reflected/diffracted light beam when viewed facing the photodetector 9. The difference in locations of the optical path axis c1 and overlapped portions of the reflected/diffracted light beam is due to the fact that the reflected/diffracted light beam is observed in opposite directions.

When compared among the reflected/diffracted light beams in FIGS. 7, 8A, and 8B, the reflected/diffracted light beam before being transmitted through the plate-type beam splitter 5 is symmetrically transformed into that of after being transmitted through the plate-type beam splitter 5 with respect to the optical path axis c1 (or astigmatism axis). This is because the reflected/diffracted light beam transmitted through the plate-type beam splitter 5 undergoes the symmetric transformation with respect to the optical path axis c1 due to astigmatism that causes focal point variations in vertical and horizontal directions.

The reflected/diffracted light beam is symmetrically transformed with respect to the optical path axis c1 or astigmatism axis. However, for ease of understanding and illustration, the optical path axis c1 is used herein as the axis of symmetric transformation of the reflected/diffracted light beam. The astigmatism axis refers to the vertical axis in the plate-type beam splitter 5 and is inclined 45 degrees relative to the optical path axis c1 since the plate-type beam splitter 5 is tilted 45 degrees with respect to the same.

To detect a tracking error signal by the DPD method, the $0^{th}$-order beam Lm and the $\pm 1^{st}$-order beams Ls reflected and diffracted by the optical disc 1 are evenly received by four section plates A–D of the main photodetector 9a (FIG. 5) in a normal state, i.e., where a light beam spot is formed at a center of a track on the optical disc 1.

As is evident in FIG. 8C illustrating a case in which the reflected/diffracted light beam of FIG. 8B is received by the main photodetector 9a shown in FIG. 5, a dividing line d1 of the main photodetector 9a shown in FIG. 5 is not identical to a bisector axis Ic for the reflected/diffracted light beam, and they are located in the opposite direction with respect to an axis in the tangential direction. This makes it impossible to detect a tracking error signal by the DPD method without rotation of the photodetector 9. That is, to enable detection of a tracking error signal using the DPD method, the photodetector 9 is required to be rotated at a significantly large angle.

Here, the bisector axis Ic for the reflected/diffracted light beam is defined as an axis that passes through the center of the reflected/diffracted light beam received by the main photodetector 9a and divides the $\pm 1^{st}$-order diffracted beams Ls into two equal parts in a normal state, in which the sizes of regions where the $\pm 1^{st}$-order diffracted beams Ls overlap the $0^{th}$-order diffracted beam Lm are identical and the overlapping regions are symmetrical with respect to the axis in the tangential direction.

In FIG. 8C, the main photodetector 9a indicated by a solid line does not rotate, while that indicated by a dotted line rotates so that the dividing line d1 is identical to the bisector axis Ic for the reflected/diffracted light beam in order to detect a tracking error signal by the DPD method.

As illustrated in FIG. 8C, in the case of applying the conventional arrangement method, the photodetector 9 needs to rotate at an angle derived by adding the absolute value of an angle θ1 at which the dividing line d1 of the main photodetector 9a is inclined relative to the axis in the tangential direction to the absolute value of an angle θ2 at which the bisector axis Ic for the reflected/diffracted light beam is inclined relative to the axis in the tangential direction.

Where the optical pickup system is arranged so that the optical path axis c1 forms an angle of 35 degrees or less with respect to the axis in the tangential direction, and the optical pickup is arranged toward the central axis Mc of the motor from the right as shown in FIG. 4 according to the conventional method, the bisector axis Ic for the reflected/diffracted light beam forms an angle of approximately 10 degrees or more with respect to the axis in the tangential direction. Since the dividing line d1 of the main photodetector 9a in the photodetector 9 is tilted at approximately 5–10 degrees with respect to the axis in the tangential direction in the opposite direction to the bisector axis Ic, the photodetector 9 has to rotate at an angle of 15 degrees or more for detection of a tracking error signal using the DPD method.

For example, where the bisector axis Ic forms an angle of approximately 10 degrees with respect to the axis in the tangential direction, since the optical path axis c1 of the optical pickup system is tilted 35 degrees with respect to the axis in the tangential direction, where the dividing line d1 of the photodetector 9 is inclined 6 degrees relative to the axis in the tangential direction, the photodetector 9 needs to rotate at approximately 16 degrees. In another example, where the dividing line d1 is inclined 10 degrees relative to the axis in the tangential direction, the photodetector 9 has to rotate by 20 degrees.

Although FIG. 8C only shows the main photodetector 9a for simplification, as the main photodetector 9a rotates, the entire photodetector 9 shown in FIG. 4 rotates.

Where the optical pickup system is arranged so that the optical path axis c1 is tilted with respect to the tangential direction and the photodetector 9 is placed toward the rotation center Mc of the motor according to the conventional method as illustrated in FIG. 4, there are many difficulties in detecting tracking error signals by DPD and three-beam methods using one photodetector 9.

That is, to detect a tracking error signal by the DPD method, the phtodetector 9 has to rotate to an extent to prevent deviation of sub-beams that detect a tracking error signal by a three-beam method from the sub-photodetectors 9b and 9c. Angles of rotation available are normally less than 15 degrees.

In the case of arranging the optical pickup system as shown in FIG. 4, since the reflected/diffracted light beam rotates in the direction in which the bisector axis Ic moves away from the dividing line d1 of the main photodetector 9a with respect to the optical path axis c1, it may be necessary to rotate the photodetector 9 at an angle of 15 degrees or more as shown in FIG. 8C so as to enable detection of a tracing error signal by the DPD method, by making the dividing line d1 of the main photodetector d1 identical to the bisector axis Ic for the reflected/diffracted light beam. Where the photodetector 9 rotates at 15 degrees or more in this manner, the sub-beams tend to deviate from the sub-photodetectors 9b and 9c, thereby making it difficult to detect a tracking error signal by the three-beam method.

That is, with the conventional arrangement of the optical pickup system, as shown in FIG. 4, it is difficult to detect tracking error signals using both DPD and three-beam methods with a single photodetector.

SUMMARY OF THE INVENTION

Accordingly, it is an aspect of the present invention to provide a method of arranging an optical pickup system on a deck of an optical recording and/or reproducing apparatus that enables detection of a tracking error signal based on a three-beam method and by a differential phase detection (DPD) method using one photodetector.

Another aspect of the present invention is to provide an optical recording and/or reproducing apparatus having the optical pickup system that is arranged using the above method.

Additional aspects and/or advantages of the invention will be set forth in part in the description which follows and, in part, will be obvious from the description, or may be learned by practice of the invention.

To achieve the above and/or other aspects of the present invention, there is provided a method of arranging an optical pickup system on a deck of an optical recording and/or reproducing apparatus, wherein the optical pickup system includes a light source, a diffractive optical element that diffracts a light beam incident from the light source and splits the light beam into at least three beams, a plate-type beam splitter that changes a propagation path of the light beam, and a photodetector comprising at least one main photodetector having at least four sections and a plurality of sub-photodetectors and is provided so as to have a reflecting mirror redirect the propagation path of the light beam emitted from the light source toward a recording medium, the method comprising, where the propagation path of the light beam transmitted through the plate-type beam splitter to the photodetector is an optical path axis, arranging the optical pickup system so as to tilt the optical path axis with respect to an axis in a tangential direction of the recording medium and to arrange the photodetector away from a rotation center of a motor that rotates the recording medium with respect to the axis of the tangential direction, and selectively optimizing the arrangement of the photodetector to detect a tracking error signal of the recording medium by a differential phase detection (DPD) method, wherein the optical pickup system detects the tracking error signal using a detection signal by the photodetector based on a three-beam method and the DPD method.

The main photodetector of the photodetector may be split into at least four sections by oblique dividing lines, and the light beam emitted onto and reflected from the recording medium may develop into a reflected/diffracted beam having a structure in which $\pm 1^{st}$-order diffracted beams partially overlap a $0^{th}$-order diffracted beam based on a presence of pits or marks formed on the recording medium. Where an axis that passes through a center of the reflected/diffracted light beam received by the main photodetector and divides the $\pm 1^{st}$-order diffracted beams of the reflected/diffracted light beam into two equal parts in a normal state is a bisector axis, one dividing line of the main photodetector and the bisector axis for the reflected/diffracted light beam may be placed on the same side with respect to an axis corresponding to the axis in the tangential direction.

To achieve the above and/or other aspects of the present invention, there is provided another method of arranging an optical pickup system on a deck of an optical recording and/or reproducing apparatus, wherein the optical pickup system includes a light source, a diffractive optical element that diffracts a light beam incident from the light source and splits the light beam into at least three beams, a plate-type beam splitter that changes a propagation path of the light beam, and a photodetector comprising at least one main photodetector having at least four sections and a plurality of sub-photodetectors and is provided so as to have a reflecting mirror redirect the propagation path of the light beam emitted from the light source toward a recording medium, the method comprising, in response to the light beam emitted onto and reflected from the recording medium being a reflected/diffracted light beam having a structure in which $\pm 1^{st}$-order diffracted beams partially overlap a $0^{th}$-order diffracted beam based on presence of pits or marks formed on the recording medium, and where an axis that passes through a center of the reflected/diffracted light beam received by the main photodetector and divides the $\pm 1^{st}$-order diffracted beams of the reflected/diffracted light beam into two equal parts in a normal state is a bisector axis, arranging the optical pickup system so that one dividing line of the main photodetector and the bisector axis for the reflected/diffracted light beam are placed on the same side with respect to an axis corresponding to an axis in a tangential direction of the recording medium, and selectively optimizing the arrangement of the photodetector to detect a tracking error signal of the recording medium by a differential phase detection (DPD) method, wherein the optical pickup system detects the tracking error signal using a direction signal by the photodetector based on a three-beam method and the DPD method.

The photodetector may be selectively adjusted to rotate so as to have the dividing line of the main photodetector coincident with the bisector axis for the reflected/diffracted light beam. The light source may be placed at a location near a rotation center of a motor that rotates the recording medium.

To achieve the above and/or other aspects of the present invention, there is provided an optical recording and/or reproducing apparatus comprising an optical pickup system for recording and/or reproducing information on and/or from a recording medium, wherein the optical pickup system includes a light source, a diffractive optical element that diffracts a light beam incident from the light source and splits the light beam into at least three beams, a plate-type beam splitter that changes a propagation path of the light beam, and a photodetector comprising at least one main photodetector having at least four sections and a plurality of sub-photodetectors and is provided so as to have a reflecting mirror redirect the propagation path of the light beam emitted from the light source toward the recording medium, and where the propagation path of the light beam transmitted through the plate-type beam splitter to the photodetector is an optical path axis, the optical pickup system is arranged so as to tilt the optical path axis relative to an axis in a tangential direction of the recording medium and to place the photodetector away from a rotation center of a motor that rotates the recording medium.

To achieve the above and/or other aspects of the present invention, there is provided another optical recording and/or reproducing apparatus comprising an optical pickup system for recording and/or reproducing information on and/or from a recording medium, wherein the optical pickup system includes a light source, a diffractive optical element that diffracts a light beam incident from the light source and splits the light beam into at least three beams, a plate-type beam splitter that changes a propagation path of the light beam, and a photodetector comprising at least one main photodetector having at least four sections and a plurality of sub-photodetectors and is provided so as to have a reflecting mirror redirect the propagation path of the light beam emitted from the light source toward the recording medium, and the light beam emitted onto and reflected from the recording medium develops into a reflected/diffracted light beam having a structure in which $\pm 1^{st}$-order diffracted beams partially overlap a $0^{th}$-order diffracted beam based on a presence of pits or marks formed on the recording medium. Where an axis that passes through a center of the reflected/diffracted light beam received by the main photodetector and divides the $\pm 1^{st}$-order diffracted beams of the reflected/diffracted light beam into two equal parts in a normal state is a bisector axis, the optical pickup system is arranged so as to place one dividing line of the main photodetector and the bisector axis for the reflected/diffracted light beam on the same side with respect to an axis corresponding to an axis in a tangential direction of the recording medium.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
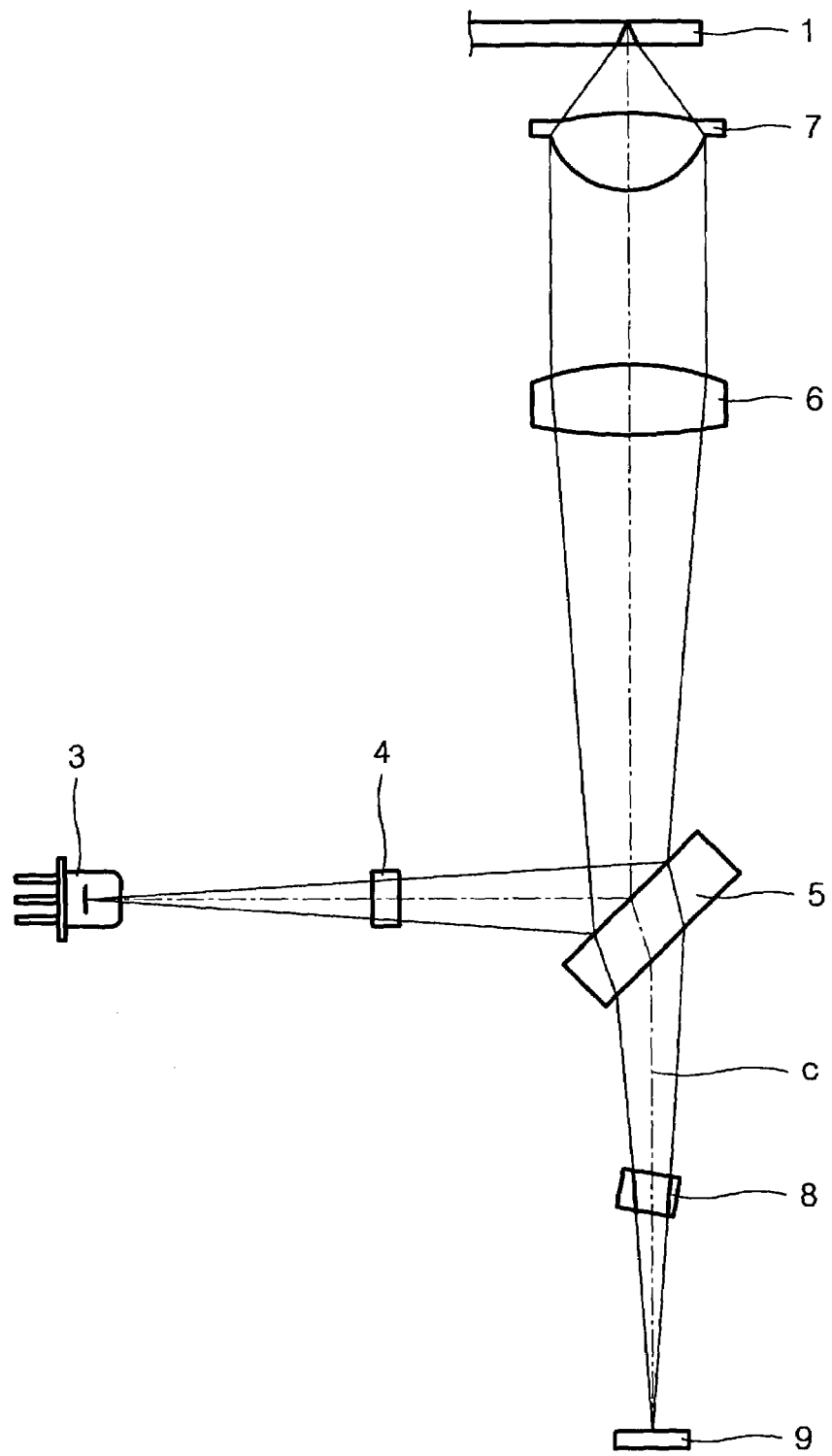
FIG. 1 is a view illustrating an optical configuration of an optical pickup.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

An optical pickup system arranged by an arrangement method according to the present invention includes a light source, a diffractive optical element, i.e., diffraction grating which diffracts a light beam incident from the light source and splits it into three or more beams, a plate-type beam splitter which converts a propagation path of the light beam, and a photodetector comprising at least one main photodetector having four or more sections, and a plurality of sub-photodetectors. The optical pickup system, constructed so that a reflecting mirror redirects the propagation path of the light beam emitted from the light source toward an optical disc (a recording medium), is mounted on a deck of an optical recording and/or reproducing apparatus.

The optical pickup system arranged by the arrangement method according to the present invention and optical recording and/or reproducing apparatus using the optical pickup system have the optical configuration and arrangement that allows detection of tracking error signals by a three-beam method and a differential phase detection (DPD) method. The optical configuration of the optical pickup system arranged according to the arrangement method of the present invention refers to an optical pickup system, for an illustrative purpose, shown and described with references to FIGS. 1 and 2.

Figure 2:
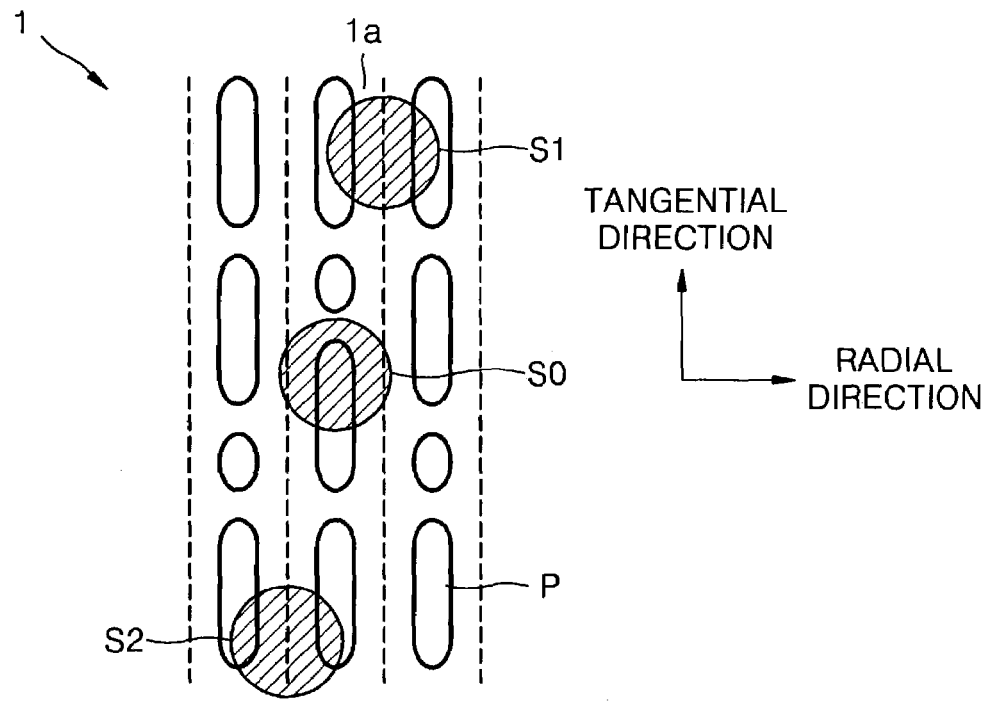
FIG. 2 is a plan view illustrating a state in which $0^{th}$-order and $\pm 1^{st}$-order beams diffracted by a grating are focused onto an optical disc as a main light beam spot S0 and two sub-light beam spots S1 and S2, respectively, so as to enable detection of a tracking error signal by a three-beam method.
Figure 3:
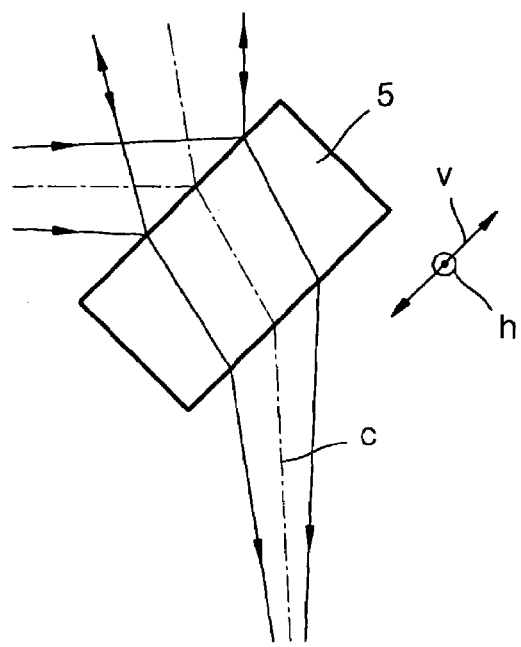
FIG. 3 is an enlarged view of a plate-type beam splitter shown in FIG. 1.
Figure 4:
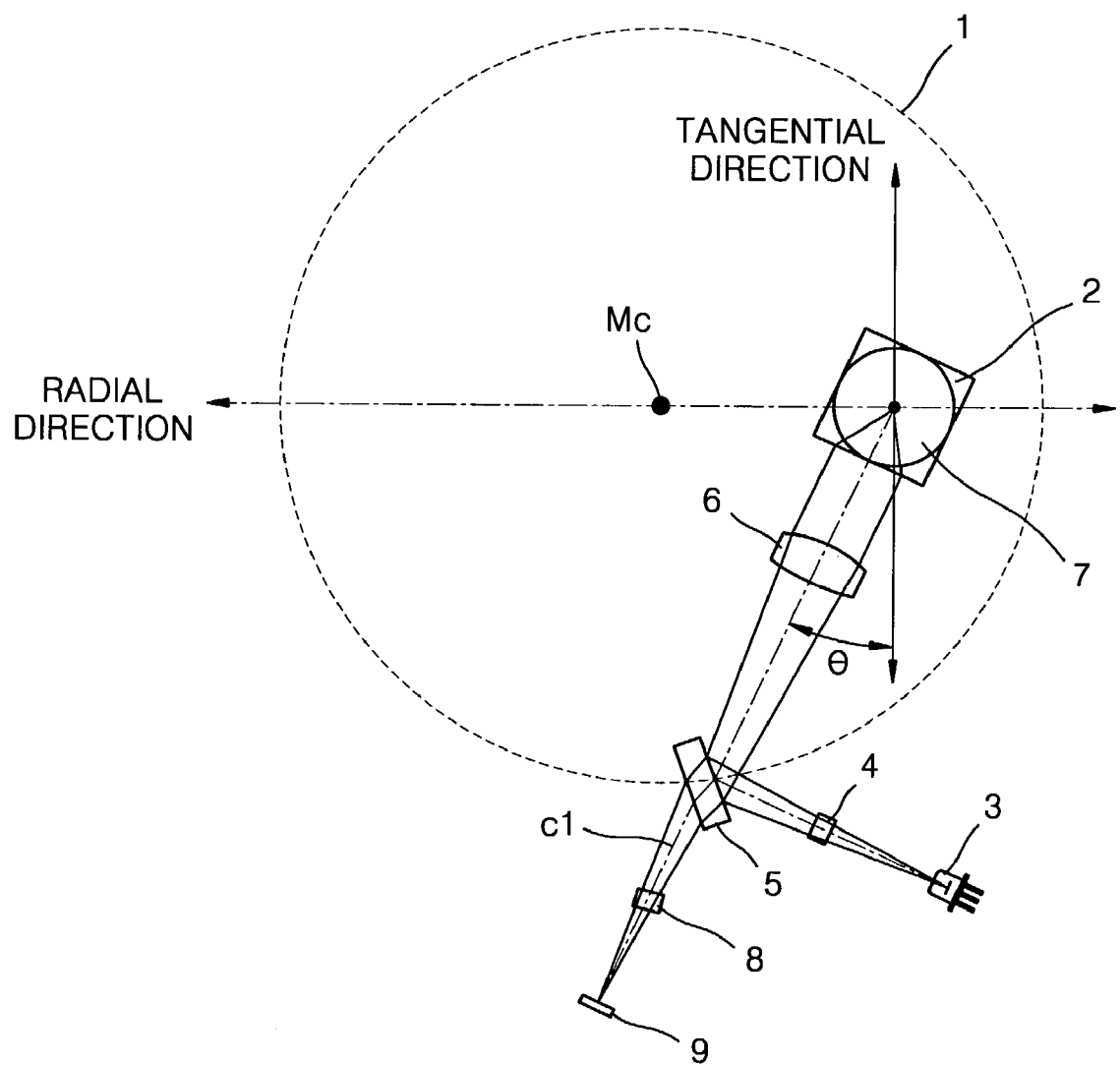
FIG. 4 is a plan view illustrating a structure in which the optical pickup system of FIG. 1 is arranged on a deck of an optical recording and/or reproducing apparatus by a conventional method.
Figure 9:
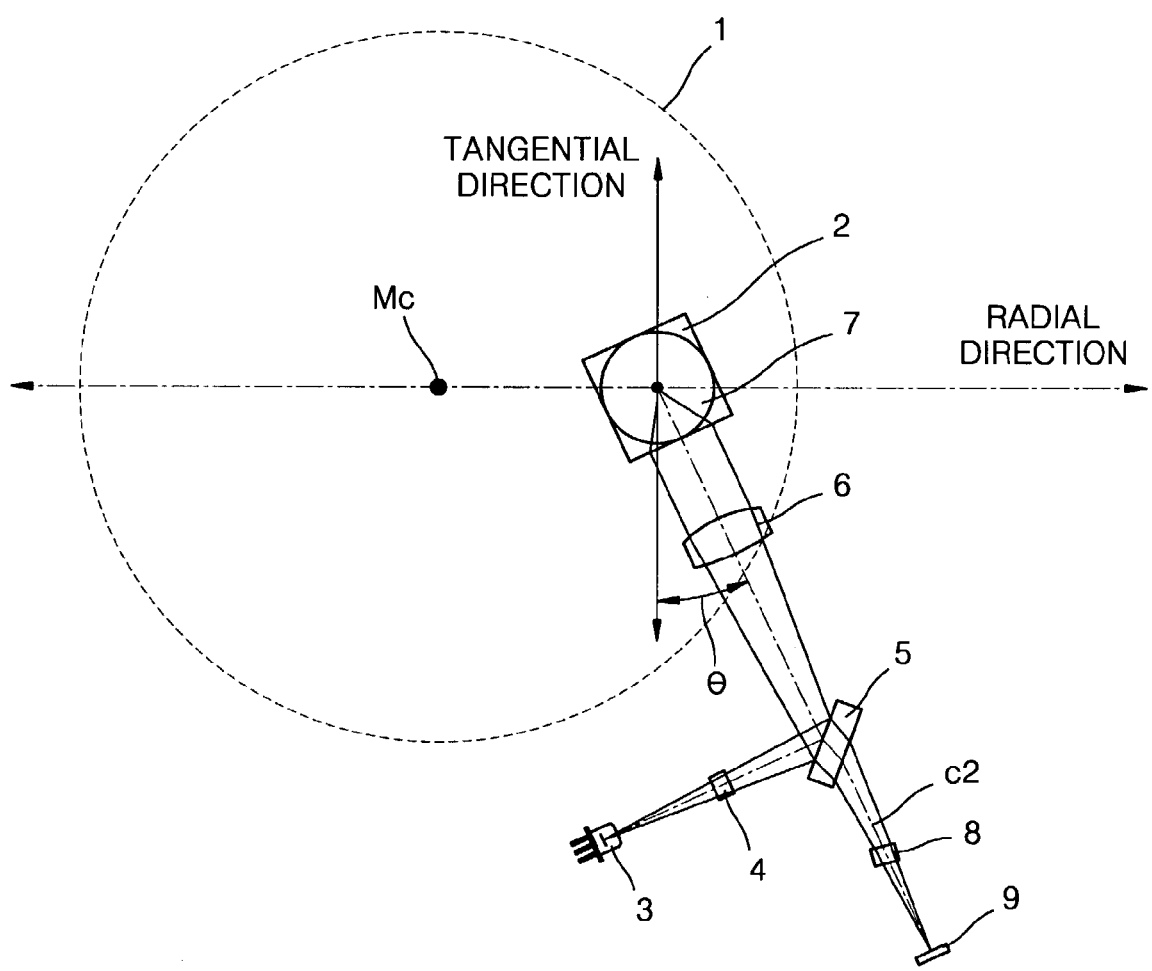
FIG. 9 is a view illustrating the optical pickup system of FIG. 1 which is arranged on a deck of an optical recording and/or reproducing apparatus by an arrangement method according to an embodiment of the present invention.

FIG. 9 shows an example of the optical pickup system of FIG. 1 that is arranged on a deck of an optical recording and/or reproducing apparatus by an arrangement method according to an embodiment of the present invention. To shorten the descriptions of elements performing substantially the same or similar function, the elements performing substantially the same or similar function as those in FIGS. 1, 2 and 4 are represented by the same reference numerals in FIG. 9.

Referring to FIG. 9, according to a method of arranging the optical pickup of the present invention, where an axis of propagation path of a light beam transmitted through a beam splitter 5 to a photodetector 9 is an optical path axis c2, the optical pickup system is arranged so as to have the optical path axis c2 tilted with respect to an axis in a tangential direction and the photodetector 9 placed away from a rotation center Mc of a motor (not shown). As described above, the tangential direction refers to a direction of a series of pits or marks formed along a track on an optical disc 1.

Even where the optical pickup system is arranged in this way, the reflected/diffracted light beam transmits through the plate-type beam splitter 5 and is symmetrically transformed with respect to the optical path axis c2 or an astigmatism axis.

The light beam emitted onto and reflected from the optical disc 1 becomes the reflected/diffracted light beam having a structure in which the $\pm 1^{st}$-order diffracted beams Ls partially overlap the $0^{th}$-order diffracted beam Lm due to the presence of the pits or marks formed on the optical disc 1. The ±$1^{st}$-order diffracted beams Ls overlapping the $0^{th}$-order diffracted beam Lm in a normal state has a symmetrical distribution with respect to the axis in the tangential direction.

Figure 6:
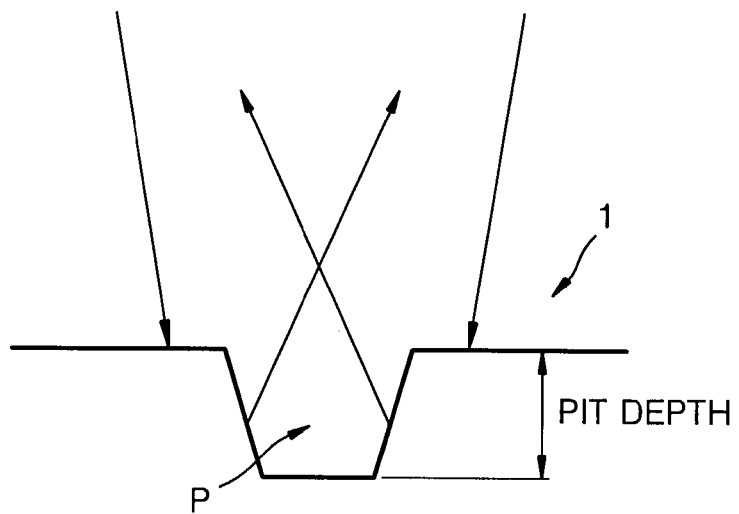
FIG. 6 is a view illustrating a state in which diffraction occurs on an edge of a pit P, where a light beam spot is formed on the pit P of an optical disc.
Figure 7:
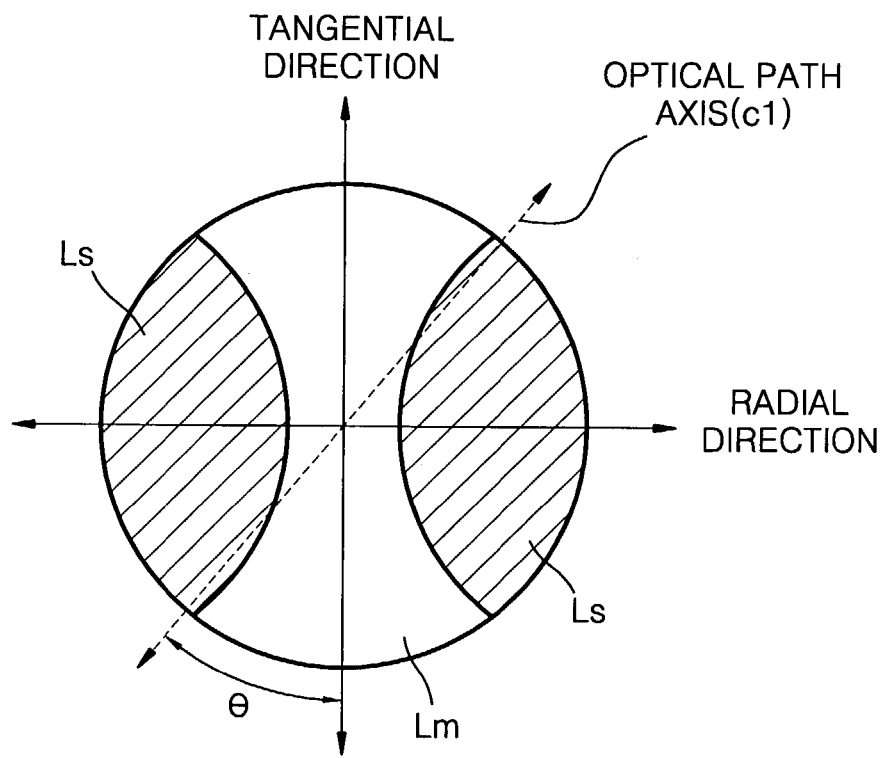
FIG. 7 is a view illustrating a reflected/diffracted light beam (before being transmitted through a plate-type beam splitter) that passes through an objective lens and travels to a collimating lens where the optical pickup system of FIG. 1 is arranged according to a conventional method.
Figure 8A:
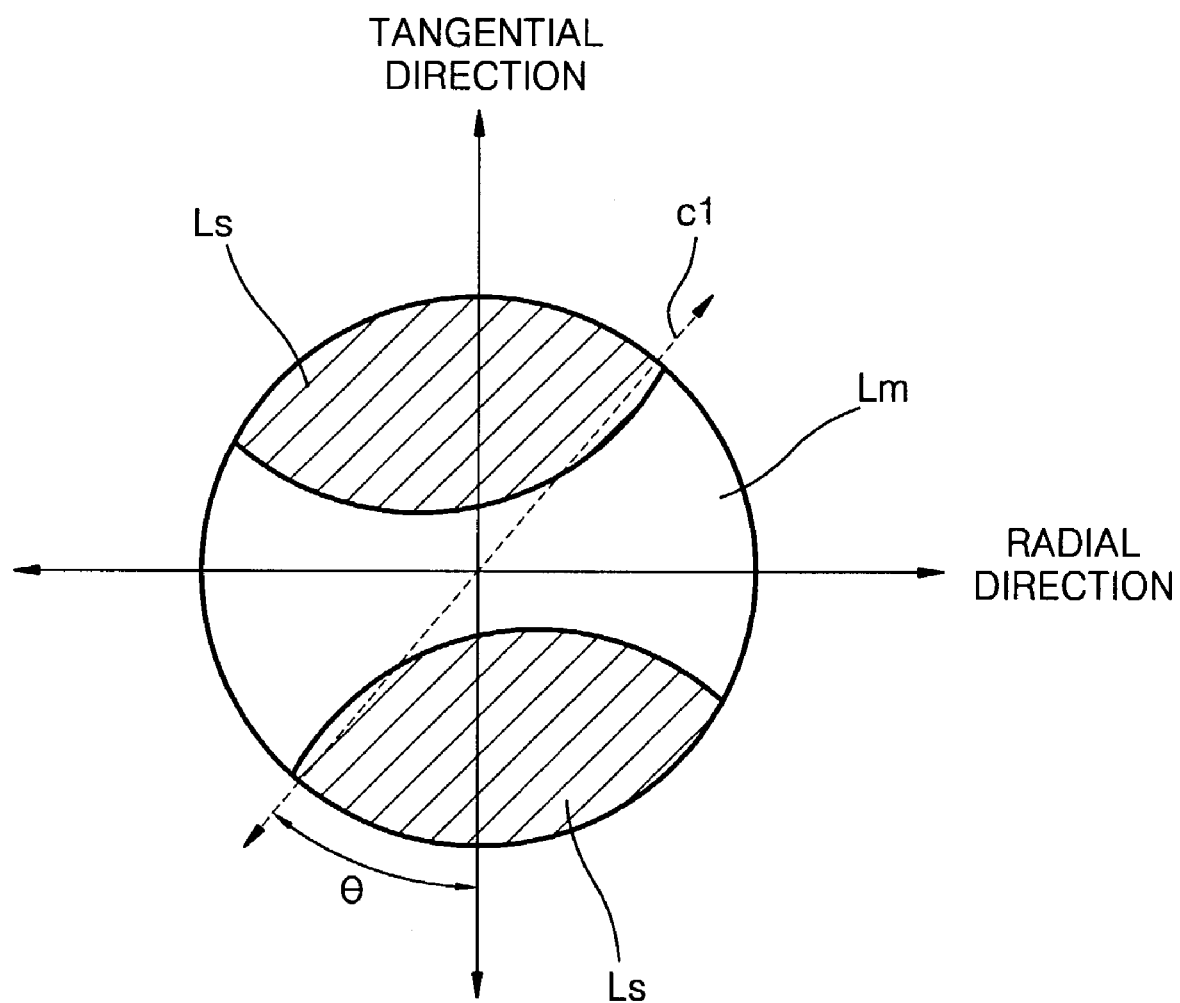
FIG. 8A is a view illustrating a reflected/diffracted light beam transmitted through the plate-type beam splitter in the optical pickup system of FIG. 1 arranged according to the conventional method, when viewed facing the plate-type beam splitter.
Figure 8B:
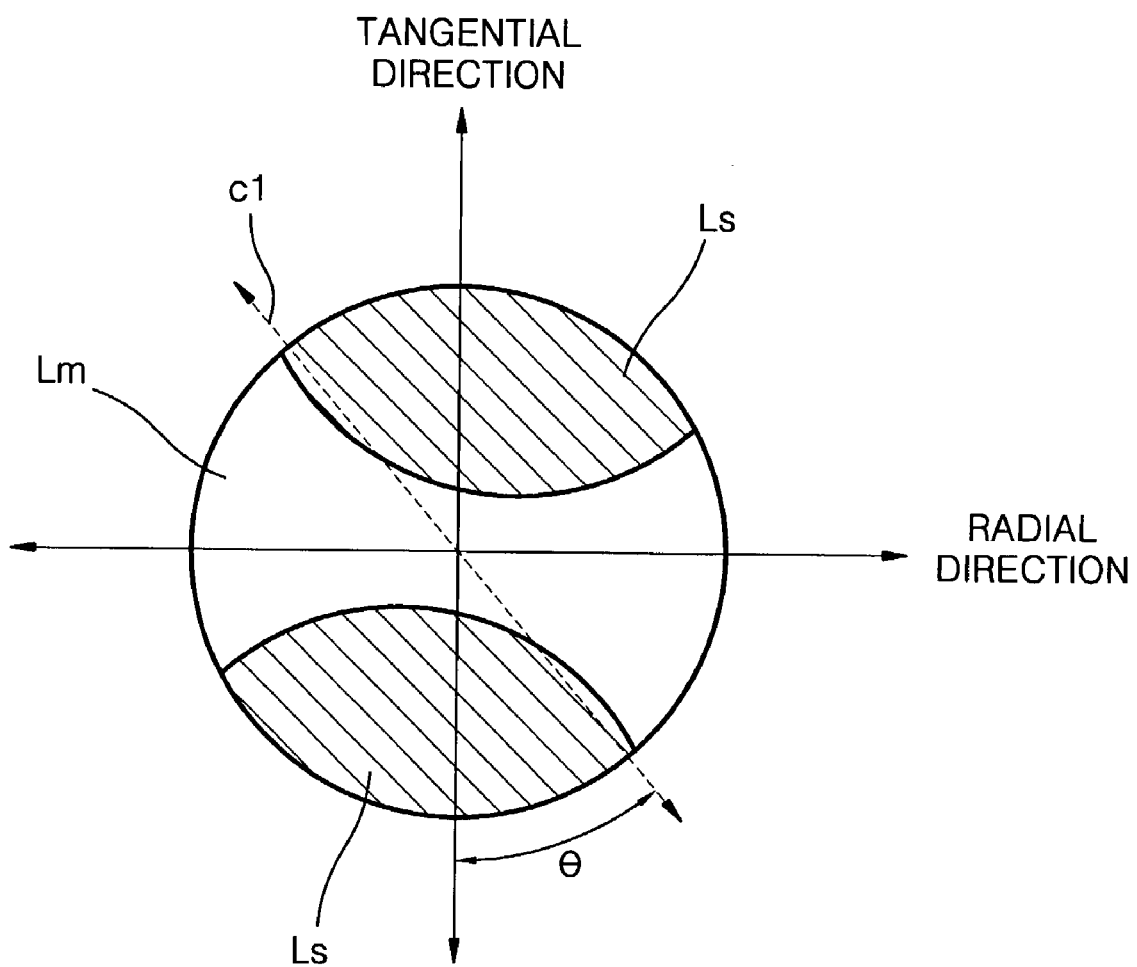
FIG. 8B is a view illustrating the reflected/diffracted light beam of FIG. 8A, when viewed facing the photodetector.
Figure 8C:
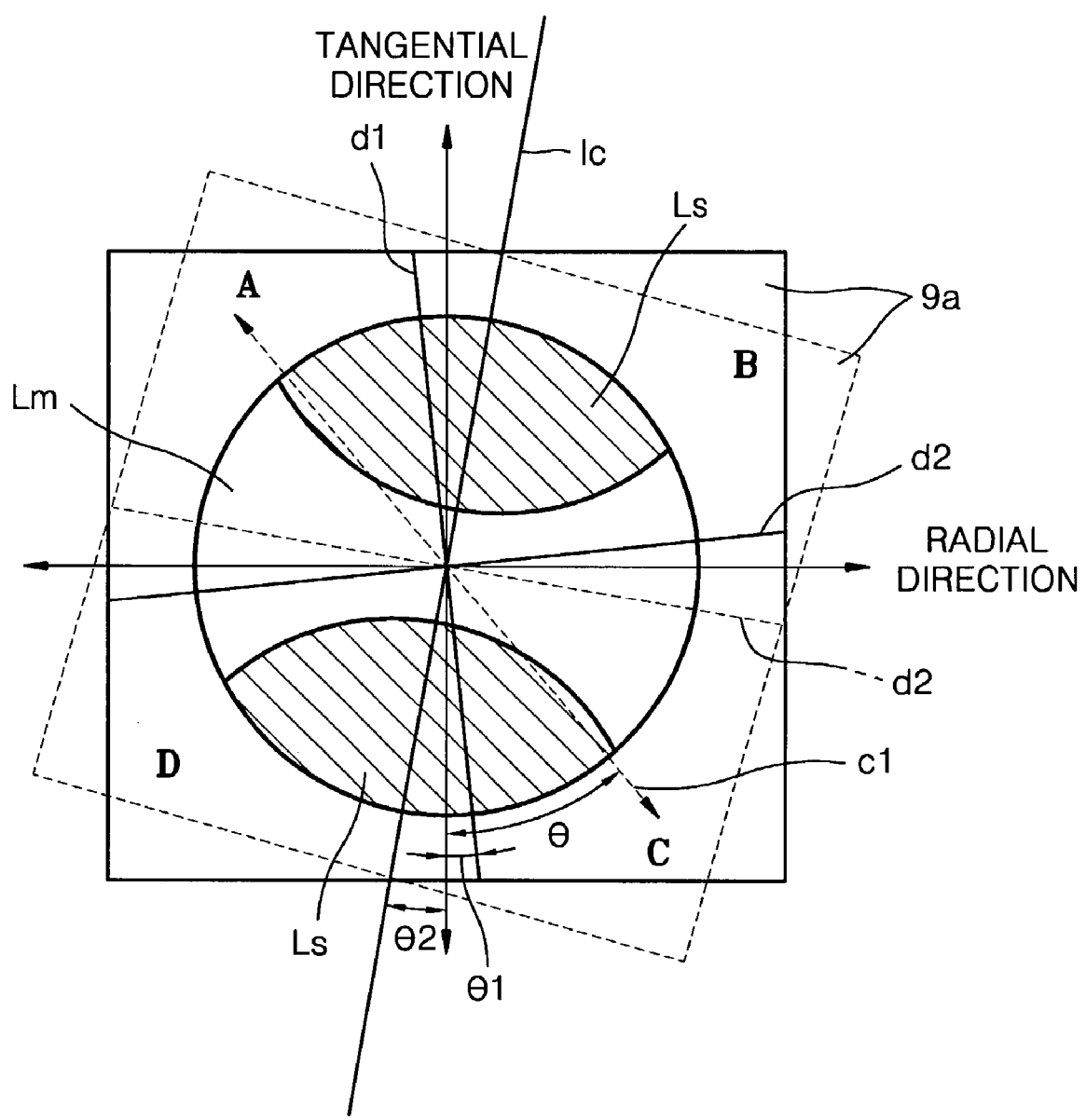
FIG. 8C is a view illustrating a main photodetector (indicated by a solid line) that does not rotate and a main photodetector (indicated by a dotted line) that rotates so that a dividing line is identical to a bisector axis for the reflected/diffracted light beam to receive the reflected/diffracted light beam of FIG. 8B and to enable detection of a tracking error signal by the DPD method.

The reflected/diffracted light beam is as described with references to FIGS. 6 and 7, and accordingly, a detailed description thereof will be omitted. Also, the principle of symmetrical transformation with respect to the optical path axis c2, as the reflected/diffracted light beam transmits through the plate-type beam splitter 5, is apparent from the description related to the conventional arrangement method of FIG. 4 for the optical pickup system, so a detailed description thereof will be omitted.

Figure 10:
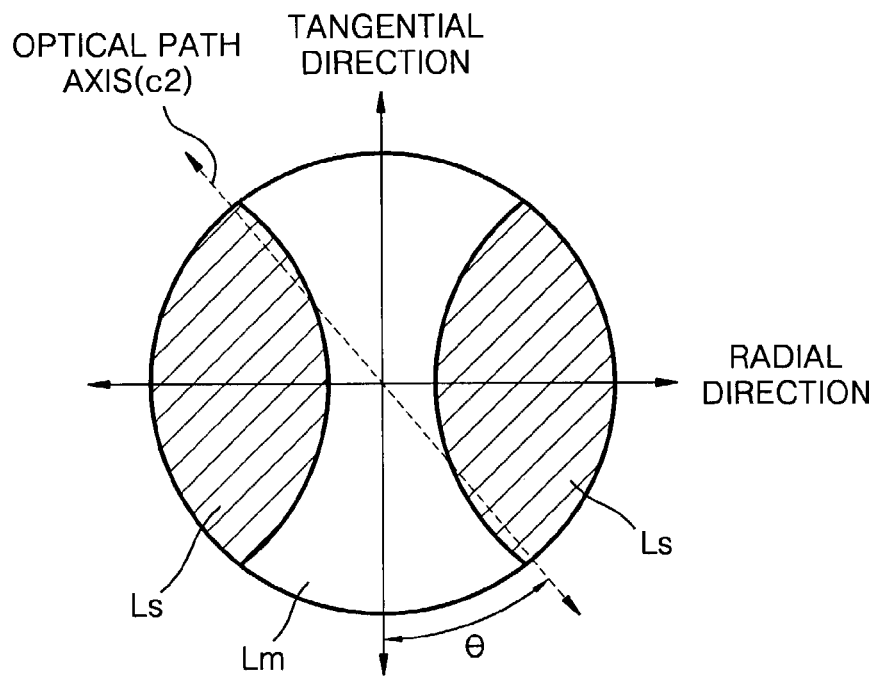
FIG. 10 is a view illustrating a reflected/diffracted light beam (before being transmitted through a plate-type beam splitter) that passes through an objective lens and travels to a collimating lens where the optical pickup system of FIG. 1 is arranged by the arrangement method according to the present invention.

FIG. 10 shows a reflected/diffracted light beam (before being transmitted through the plate-type beam splitter 5) that passes through the objective lens 7. A comparison of the reflected/diffracted light beams of FIGS. 7 and 10, that is, the conventional arrangement method and arrangement method of the present invention, respectively, shows that while they are of the same shape, the optical path axes c1 and c2 are symmetrical to each other with respect to the axis in the tangential direction.

To clarify the difference in operation between the arrangement method of the present invention and the conventional arrangement method, FIG. 10 shows an example in which the optical path axis c2 is symmetrical to the optical path axis c1 shown in FIG. 7 with respect to the axis in the tangential direction. Thus, the optical path axis c2 is not necessarily symmetrical to the optical path axis c1 with respect to the axis in the tangential direction. An important aspect of the present invention is to arrange the optical pickup so as to locate the optical path axis c2 with respect to the axis in the tangential direction, in the opposite direction to the conventional optical path axis c1.

Figure 11:
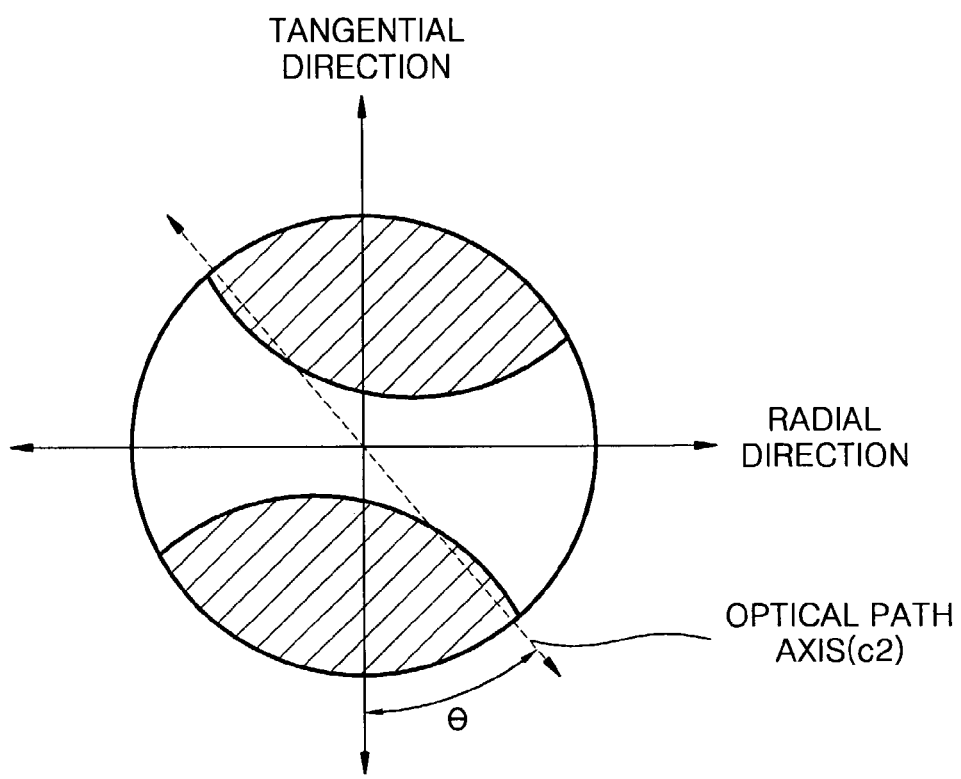
FIG. 11 is a view illustrating a reflected/diffracted light beam transmitted through the plate-type beam splitter in the optical pickup system of FIG. 1 arranged by the arrangement method according to the present invention, when viewed facing the plate-type beam splitter.
Figure 12:
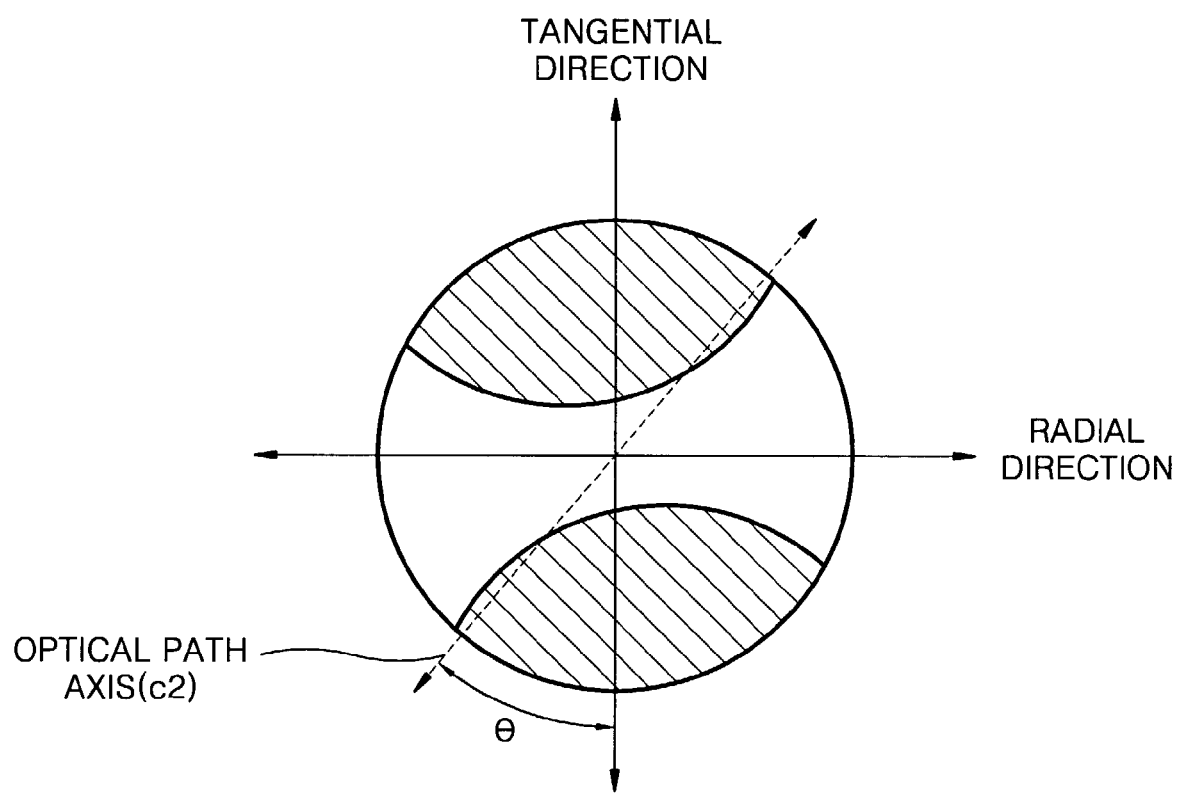
FIG. 12 is a view illustrating the reflected/diffracted light beam of FIG. 11, when viewed facing the photodetector.

FIGS. 11 and 12 show the reflected/diffracted light beams that are transmitted through the plate-type beam splitter 5. FIG. 11 shows the optical path axis c2 and reflected/diffracted light beam when viewed facing the plate-type beam splitter 5, while FIG. 12 shows the same when viewed facing the photodetector 9. The difference in locations of the optical path axis c2 and overlapped portions of the reflected/diffracted light beam is due to the fact that the reflected/diffracted light beam is observed in opposite directions.

As previously described with reference to FIG. 5, the reflected/diffracted light beam shown in FIGS. 10 through 12 has a structure in which the $0^{th}$-order beam reflected/diffracted after having been emitted with respect to the pit on the optical disc 1 is partially overlapped by the ±$1^{st}$-order beams.

Referring to FIGS. 10, 11, and 12, even where the optical pickup is arranged using the arrangement method according to the present invention, the reflected/diffracted light beam before being transmitted through the plate-type beam splitter 5 is symmetrically transformed into that of after being transmitted through the plate-type beam splitter 5 with respect to the optical path axis c2 (astigmatism axis), due to astigmatism that causes focal point variations in vertical and horizontal directions.

The astigmatism axis is inclined 45 degrees relative to the optical path axis c2 since the plate-type beam splitter 5 is tilted 45 degrees with respect to the same.

Here, the reflected/diffracted light beam is symmetrically transformed with respect to the optical path axis c2 or astigmatism axis. However, for ease of understanding and illustration, the optical path axis c2 is used herein as the axis of symmetric transformation of the reflected/diffracted light beam.

In the case of applying the arrangement method of the present invention, as shown in FIGS. 11 and 12, since the optical path axis c2 is inclined with respect to the axis in the tangential direction so as to have the photodetector 9 located away from the rotation center Mc of the motor, the reflected/diffracted light beam rotates in the opposite direction to that of applying the conventional arrangement method of FIG. 4 where it transmits through the plate-type beam splitter 5.

Figure 5:
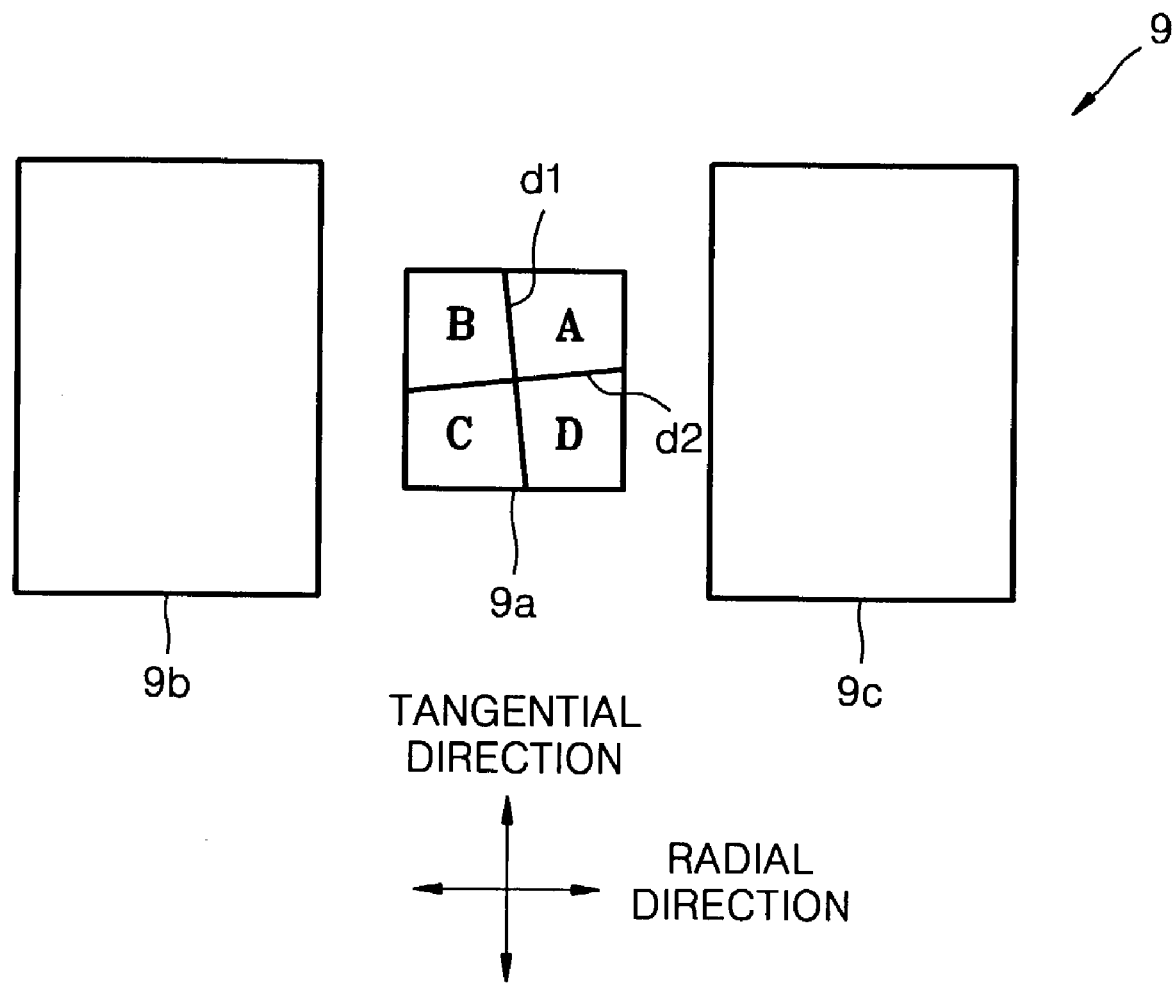
FIG. 5 is a plan view illustrating a photodetector constructed to enable detection of tracking error signals by a three-beam method and a differential phase detection (DPD) method.
Figure 13:
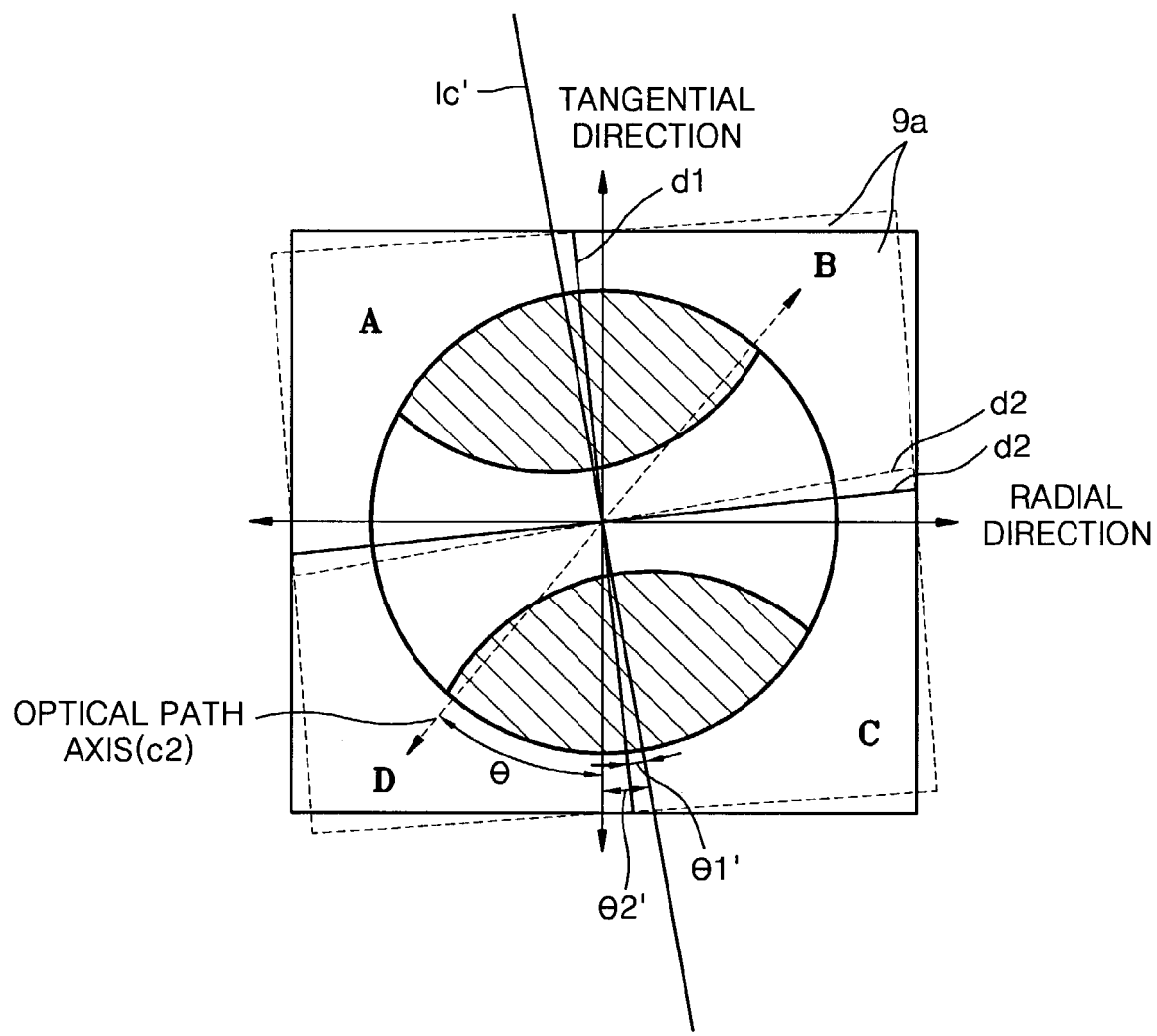
FIG. 13 is a view illustrating a main photodetector (indicated by a solid line) that does not rotate and a main photodetector (indicated by a dotted line) that rotates so that a dividing line is identical to a bisector axis for the reflected/diffracted light beam to receive the reflected/diffracted light beam of FIG. 12, enabling detection of a tracking error signal by a DPD method.
Figure 14:
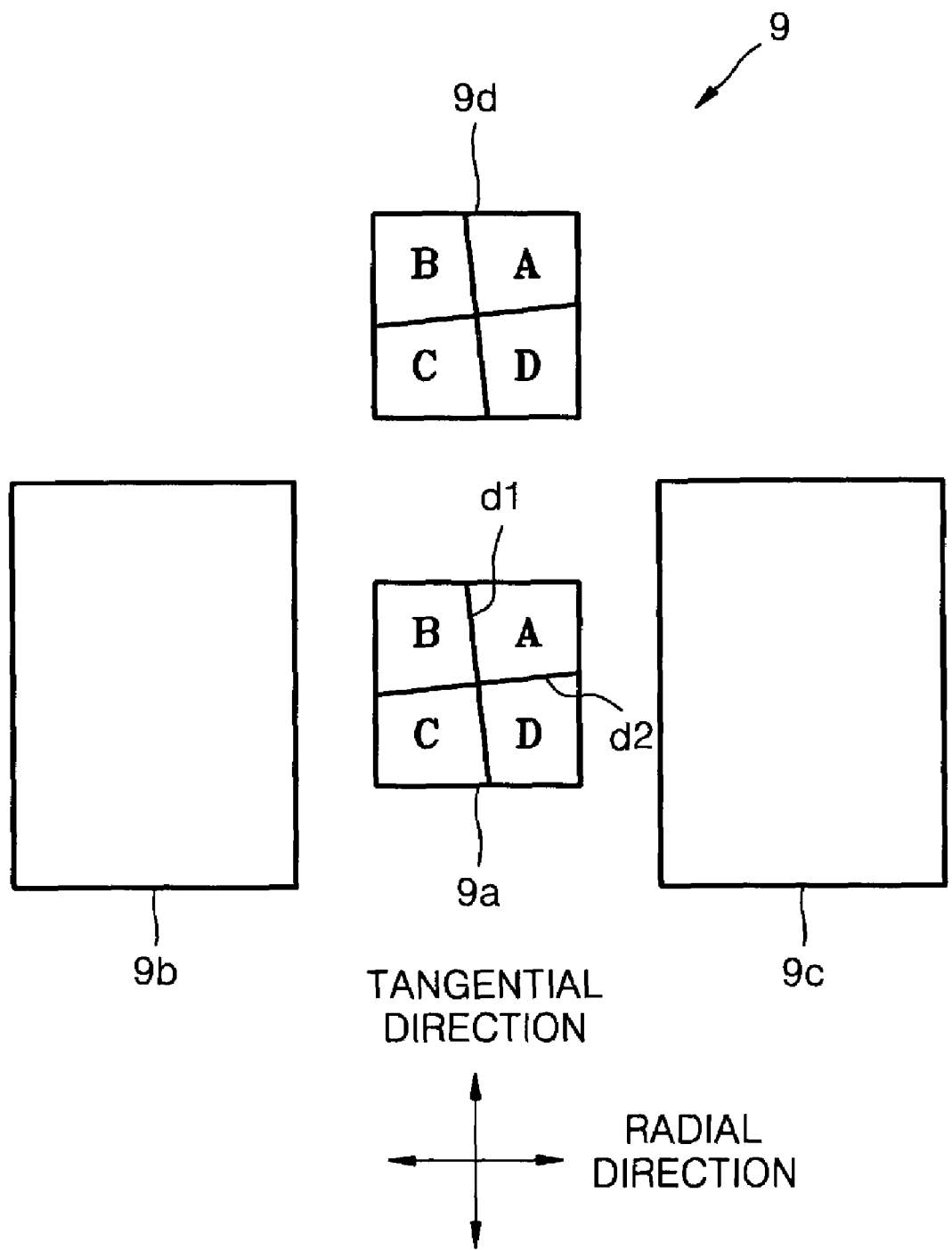
FIG. 14 is a plan view illustrating a photodetector constructed to enable detection of tracking error signals by a three-beam method and a DPD method.

Here, in the case of using a photodetector equipped with a main photodetector that is split into at least four sections by oblique dividing lines d1 and d2, as shown in FIGS. 5 and 14, the dividing line d1 of the main photodetector 9a and a bisector axis Ic' for the reflected/diffracted light beam are placed on the same side with respect to the axis in the tangential direction, as shown in FIG. 13.

The bisector axis Ic' for the reflected/diffracted light beam is referred to as an axis that passes through the center of the reflected/diffracted light beam received by the main photodetector 9a and divides portions of the ±$1^{st}$-order diffracted beams Ls into two equal parts in a normal state, in which the sizes of regions where the ±$1^{st}$-order diffracted light beams Ls overlap the $0^{th}$-order diffracted beam Lm are identical and the overlapping regions are symmetrical with respect to the axis in the tangential direction.

The photodetector 9 comprises the single main photodetector 9a having four sections and the pair of sub-photodetectors 9b and 9c, as shown in FIG. 5, or a pair of main photodetectors 9a and 9d and the pair of sub-photodetectors 9b and 9c, as shown in FIG. 14. The main photodetectors 9a and/or 9d are split into at least four sections by the oblique dividing lines d1 and d2. The dividing lines d1 and d2 of the main photodetectors 9a are inclined with respect to axes in the tangential and radial directions before the photodetector 9 is adjusted by rotation.

The photodetectors 9 of FIGS. 5 and 14 are constructed to detect tracking error signals using both a three-beam method and a DPD method.

Where the optical pickup system is arranged as described above, the optical path axis c2 is tilted with respect to the axis in the tangential direction so as to have the photodetector 9 placed away from the rotation center Mc of the motor, and an angle between one dividing line d1 of the main photodetector 9a and bisector axis Ic' for the reflected/diffracted light beam minimized. Furthermore, where the dividing line d1 of the main photodetector 9a is not identical to the axis in the tangential direction, they are positioned on the same side with respect to the axis in the tangential direction.

Once the overall optical pickup system has been arranged in this manner, where the arrangement of the photodetector 9 is selectively optimized to enable detection of a tracking error signal by the DPD method, it is possible to detect tracking error signals by the three-beam method and DPD method using the detection signal of the photodetector 9.

For example, the arrangement of the photodetector 9 is selectively optimized as follows. Where the photodetector 9 is rotated by a small angle θ2'-θ1' corresponding to the difference between an angle θ2' formed by the bisector axis Ic' for the reflected/diffracted light beam with respect to the axis in the tangential direction and an angle θ1' formed by the dividing line d1 of the main photodetector 9a with respect to the same, the dividing line d1 can be coincident with the bisector axis Ic' for the reflected/diffracted light beam. In this case, the rotation angle of the photodetector 9 may be less than 15 degrees.

Where the optical path axis c2 forms an angle of 35 degrees with respect to the axis in the tangential direction in the direction away from the rotation center Mc of the motor and the dividing line d1 forms 6 degrees with respect to the same, an angle formed by the bisector axis Ic' for the reflected/diffracted light beam with respect to the axis in the tangential direction is 10 degrees. Accordingly, the angle between the bisector axis Ic' and dividing line d1 of the main photodetector 9*a* is 4 degrees. Thus, rotation of the photodetector 9 by 4 degrees allows the dividing line d1 to be coincident with the bisector axis Ic' for the reflected/diffracted light beam.

Where the dividing line d1 of the main photodetector 9*a* forms an angle of 10 degrees with respect to the axis in the tangential direction, it eliminates the need to rotate the photodetector 10 since the angles formed by the bisector axis Ic' and dividing line d1 with respect to the axis in the tangential direction are identical to each other.

That is, in the optical pickup system arranged according to an arrangement method of the present invention, where the optical path axis c2 forms 35 degrees relative to the axis in the tangential direction and the dividing line d1 of the main photodetector 9*a* is inclined 10 degrees relative to the same, it is not necessary to rotate the photodetector 9 since the dividing line d1 is coincident with the bisector axis Ic' for the reflected/diffracted light beam.

As described above, the present method of arranging the optical pickup system minimizes the angle of rotation of the photodetector 9 to make the dividing line d1 coincident with the bisector axis Ic' for the reflected/diffracted light beam, as compared to the conventional method of FIG. 4. Furthermore, the photodetector 9 may not need to rotate in some occasions according to the angles formed by the optical path axis c2 and dividing line d1 of the main photodetector 9*a* with respect to the axis in the tangential direction.

Thus, the arrangement method of the present invention makes it possible to sufficiently receive sub-beams onto the sub-photodetectors 9*b* and 9*c* of the photodetector 9, thereby enabling detection of a tracking error signal using one photodetector based on the three-beam method and by DPD.

That is, where the optical pickup system is arranged according to the present invention, since the bisector axis Ic' for the reflected/diffracted light beam and the dividing line d1 of the photodetector 9 are inclined in the same direction with respect to the axis in the tangential direction, the former can be coincident with the latter without rotation of or by slightly rotating the photodetector 9. This makes it possible to detect tracking error signals by DPD and three-beam methods using one commercially available photodetector comprising one or more main photodetectors split by oblique dividing lines and a plurality of sub-photodetectors, as shown in FIGS. 5 and 14.

In the present invention, the light source 3 may be arranged close to the rotation center Mc of the motor. The arrangement of the optical pickup system according to the present invention in which the light source 3 is placed toward the rotation center Mc of the motor, as shown in FIG. 9, requires the space of a similar size compared to the conventional arrangement, as shown in FIG. 4, since the light source 3 can be placed toward the rotation center Mc of the motor while the photodetector 9 is placed away from the same. Thus, the arrangement method according to the present invention provides for a compact optical recording and/or reproducing apparatus.

Where the optical pickup system is mounted on the optical recording and/or reproducing apparatus using the arrangement method of the present invention, as described above, it is possible to detect tracking error signals by both DPD and three-beam methods using a reception signal generated by a single photodetector comprising at least one main photodetector and a plurality of sub-photodetectors, as shown in FIG. 5.

While a method of arranging an optical pickup system and an optical recording and/or reproducing apparatus having a deck on which the optical pickup system is mounted according to an arrangement method of the present invention have been particularly shown and described with reference to the optical pickup system of FIG. 1, it is understood that the arrangement method of the present invention is not limited to an arrangement of the optical pickup system of FIG. 1. That is, the arrangement method of the present invention is applicable to a wide variety of types of optical pickup systems which comprise at least one plate-type beam splitter as an optical path changer, and detect a tracking error signal using one photodetector by both DPD and three-beam methods.

Furthermore, while the optical pickup system has been shown and described as including a light source and a photodetector constructed as shown in FIG. 5, it is understood that the optical configuration of the optical pickup system is not limited thereto. For example, an optical pickup system arranged according to the present invention may be a compatible type having two light sources in a single package, known as TWIN LD, to emit light in an infrared wavelength range appropriate for a CD as well as light in a red wavelength range appropriate for a DVD, and a photodetector constructed as shown in FIG. 14.

Since the TWIN LD in a single package has two separate light sources, where an optical coupler is not used to unite two optical paths of the light beams emitted from the two light sources into a single path, a photodetector 9 further having at least one main photodetector 9*d* in the photodetector of FIG. 5, as shown in FIG. 14, may be used.

In this case, as shown in FIG. 14, the additional main photodetector 9*d* as well as the main photodetector 9*a* may have dividing lines oblique with respect to the axes in the tangential and radial directions, so as to enable detection of a focus error signal using astigmatism occurring at the plate-type beam splitter 5.

The principle of symmetrical transformation with respect to the optical path axis c2 or astigmatism axis, as the reflected/diffracted light beams for the light beams emitted from the two light sources of the TWIN LD (as the light source 3) transmit through the plate-type beam splitter 5, is the same as that described with references to FIGS. 9–13. Accordingly, a detailed description of the optical pickup system having the TWIN LD as the light source 3 will be omitted.

Here, the present invention makes it possible to detect a tracking error signal by the DPD method as well as an information signal and a focus error signal using detection signals detected by a main photodetector having four sections as shown in FIGS. 5 and 14, while detecting a tracking error signal by the three-beam method using detection signals generated by sub-photodetectors. The tracking error signal obtained by the three-beam method is a signal derived by subtracting a detection signal of one sub-photodetector from a detection signal of the other sub-photodetector.

Although the optical pickup system applying an arrangement method according to the present invention has been shown and described as using the photodetector constructed as shown in FIGS. 5 and 14, it is understood that various changes in a split structure of a photodetector may be made without departing from the spirit and scope of the invention.

Furthermore, while each of the pair of sub-photodetectors has been shown and described as having a single receiving area, it is understood that each sub-photodetector may be split into at least two sections. Additionally, the optical pickup system may be designed to detect a tracking error signal using another tracking technique based on the three-beam method, such as a differential push-pull method.

Although the above description is focused on the detection of a tracking error signal using the three-beam method, it will be appreciated that the present invention is not limited to this method. In other words, a three-beam method applied to detect a tracking error signal may involve a normal three-beam method and a differential push-pull detection method.

As described above, the arrangement of an optical pickup system according to a method of the present invention enables detection of a tracking error signal using one photodetector based on a three-beam method and by a DPD method.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of arranging an optical pickup system on a deck of an optical recording and/or reproducing apparatus, wherein the optical pickup system includes a light source, a diffractive optical element that diffracts a light beam incident from the light source and splits the light beam into at least three beams, a plate-type beam splitter that changes a propagation path of the light beam, and a photodetector comprising at least one main photodetector having at least four sections and a plurality of sub-photodetectors and is provided so as to have a reflecting mirror redirect the propagation path of the light beam emitted from the light source toward a recording medium, the method comprising:

where the propagation path of the light beam transmitted through the plate-type beam splitter to the photodetector is an optical path axis, arranging the optical pickup system so as to tilt the optical path axis with respect to an axis in a tangential direction of the recording medium and to arrange the photodetector away from a rotation center of a motor that rotates the recording medium with respect to the axis of the tangential direction; and selectively optimizing the arrangement of the photodetector to detect a tracking error signal of the recording medium by a differential phase detection (DPD) method, wherein the optical pickup system detects the tracking error signal using a detection signal by the photodetector based on a three-beam method and the DPD method wherein the light source is placed at a location near the rotation center of the motor.

2. The method of claim 1, wherein:

the main photodetector of the photodetector is split into at least four sections by oblique dividing lines, the light beam emitted onto and reflected from the recording medium develops into a reflected/diffracted beam having a structure in which $\pm 1^{st}$-order diffracted beams partially overlap a $0^{th}$-order diffracted beam based on a presence of pits or marks formed on the recording medium, and where an axis that passes through a center of the reflected/diffracted light beam received by the main photodetector and divides the $\pm 1^{st}$-order diffracted beams of the reflected/diffracted light beam into two equal parts in a normal state is a bisector axis, one dividing line of the main photodetector and the bisector axis for the reflected/diffracted light beam are placed on the same side with respect to an axis corresponding to the axis in the tangential direction.

3. The method of claim 2, wherein the photodetector is selectively adjusted to rotate so as to have the dividing line of the main photodetector coincident with the bisector axis for the reflected/diffracted light beam.

4. The method of claim 2, wherein the optical path axis is tilted with respect to the axis in the tangential direction so as to minimize an angle between the dividing line of the photodetector and the bisector axis.

5. The method of claim 1, wherein the optical pickup system detects the tracking error signal by using the three-beam method and by using the DPD method, with the single photodetector.

6. A method of arranging an optical pickup system on a deck of an optical recording and/or reproducing apparatus, wherein the optical pickup system includes a light source, a diffractive optical element that diffracts a light beam incident from the light source and splits the light beam into at least three beams, a plate-type beam splitter that changes a propagation path of the light beam, and a photodetector comprising at least one main photodetector having at least four sections and a plurality of sub-photodetectors and is provided so as to have a reflecting mirror redirect the propagation path of the light beam emitted from the light source toward a recording medium, the method comprising:

in response to the light beam emitted onto and reflected from the recording medium being a reflected/diffracted light beam having a structure in which $\pm 1^{st}$-order diffracted beams partially overlap a $0^{th}$-order diffracted beam based on a presence of pits or marks formed on the recording medium, and where an axis that passes through a center of the reflected/diffracted light beam received by the main photodetector and divides the $\pm 1^{st}$-order diffracted beams of the reflected/diffracted light beam into two equal parts in a normal state is a bisector axis, arranging the optical pickup system so that one dividing line of the main photodetector and the bisector axis for the reflected/diffracted light beam are inclined on the same side with respect to an axis corresponding to an axis in a tangential direction of the recording medium; and selectively optimizing the arrangement of the photodetector to detect a tracking error signal of the recording medium by a differential phase detection (DPD) method, wherein the optical pickup system detects the tracking error signal using a direction signal by the photodetector based on a three-beam method and the DPD method.

7. The method of claim 6, wherein the photodetector is selectively adjusted to rotate so as to have the dividing line of the main photodetector coincident with the bisector axis for the reflected/diffracted light beam.

8. The method of claim 7, wherein the light source is placed at a location near a rotation center of a motor that rotates the recording medium.

9. The method of claim 6, wherein the light source is placed at a location near a rotation center of a motor that rotates the recording medium.

10. The method of claim 6, wherein the optical pickup system detects the tracking error signal by using the three-beam method and by using the DPD method, with the single photodetector.

11. An optical recording and/or reproducing apparatus comprising an optical pickup system for recording and/or reproducing information on and/or from a recording medium, wherein:
the optical pickup system includes a light source, a diffractive optical element that diffracts a light beam incident from the light source and splits the light beam into at least three beams, a plate-type beam splitter that changes a propagation path of the light beam, and a photodetector comprising at least one main photodetector having at least four sections and a plurality of sub-photodetectors and is provided so as to have a reflecting mirror redirect the propagation path of the light beam emitted from the light source toward the recording medium, and
where the propagation path of the light beam transmitted through the plate-type beam splitter to the photodetector is an optical path axis, the optical pickup system is arranged so as to tilt the optical path axis relative to an axis in a tangential direction of the recording medium and to place the photodetector away from a rotation center of a motor that rotates the recording medium,
wherein the light source is placed at a location near the rotation center of the motor.

12. The apparatus of claim 11, wherein:
the main photodetector of the photodetector is split into at least four sections by oblique dividing lines,
the light beam emitted onto and reflected from the recording medium develops into a reflected/diffracted light beam having a structure in which $\pm 1^{st}$-order diffracted beams partially overlap a $0^{th}$-order diffracted beam based on presence of pits or marks formed on the recording medium, and
where an axis that passes through a center of the reflected/diffracted light beam received by the main photodetector and divides the $\pm 1^{st}$-order diffracted beams of the reflected/diffracted light beam into two equal parts in a normal state is a bisector axis, the optical pickup system is arranged so as to place one dividing line of the main photodetector and the bisector axis for the reflected/diffracted light beam on the same side with respect to an axis corresponding to the axis in the tangential direction.

13. The apparatus of claim 12, wherein the photodetector is selectively adjusted to rotate so as to have the dividing line of the main photodetector coincident with the bisector axis for the reflected/diffracted light beam.

14. The apparatus of claim 13, wherein the photodetector is rotated less than 15 degrees.

15. The apparatus of claim 11, wherein the optical pickup system detects the tracking error signal by using the three-beam method and by using the DPD method, with the single photodetector.

16. The apparatus of claim 11, wherein the light source is a TWIN-LD package having separate light sources.

17. An optical recording and/or reproducing apparatus comprising an optical pickup system for recording and/or reproducing information on and/or from a recording medium, wherein:
the optical pickup system includes a light source, a diffractive optical element that diffracts a light beam incident from the light source and splits the light beam into at least three beams, a plate-type beam splitter that changes a propagation path of the light beam, and a photodetector comprising at least one main photodetector having at least four sections and a plurality of sub-photodetectors and is provided so as to have a reflecting mirror redirect the propagation path of the light beam emitted from the light source toward the recording medium,
the light beam emitted onto and reflected from the recording medium develops into a reflected/diffracted light beam having a structure in which $\pm 1^{st}$-order diffracted beams partially overlap a $0^{th}$-order diffracted beam based on presence of pits or marks formed on the recording medium, and
where an axis that passes through a center of the reflected/diffracted light beam received by the main photodetector and divides the $\pm 1^{st}$-order diffracted beams of the reflected/diffracted light beam into two equal parts in a normal state is a bisector axis, the optical pickup system is arranged so that one dividing line of the main photodetector and the bisector axis for the reflected/diffracted light beam are inclined on the same side with respect to an axis corresponding to an axis in a tangential direction of the recording medium.

18. The apparatus of claim 17, wherein the photodetector is selectively adjusted to rotate so as to have the dividing line of the main photodetector coincident with the bisector axis for the reflected/diffracted light beam.

19. The apparatus of claim 18, wherein the light source is placed at a location near a rotation center of a motor that rotates the recording medium.

20. The apparatus of claim 17, wherein the light source is placed at a location near a rotation center of a motor that rotates the recording medium.

21. The apparatus of claim 17, wherein the reflected/diffracted light beam transmits through the plate-type beam splitter and is symmetrically transformed with respect to the optical path axis.

22. The apparatus of claim 17, wherein the dividing line is coincident with the bisector axis without rotation of the photodetector where the optical path axis forms 35 degrees relative to the axis in the tangential direction and the dividing line is inclined 10 degrees relative to the axis in the tangential direction.

23. A recording and/or reproducing apparatus comprising an optical pickup system for recording and/or reproducing information on and/or from a recording medium, wherein:
the optical pickup system includes a light source, a diffractive optical element that diffracts a light beam incident from the light source, an optical path changer that changes a propagation path of the light beam, and a photodetector comprising at least one main photodetector and a plurality of sub-photodetectors, and
where a propagation path of the light beam transmitted through the optical path changer to the photodetector is an optical path axis, a bisector axis of the optical pickup system and a dividing line of the main photodetector are inclined in the same direction with respect to an axis in a tangential direction of the recording medium so as to detect a tracking error signal of the recording medium by a three-beam based method and by a DPD method.

24. A method of arranging an optical pickup system on a deck of an optical recording and/or reproducing apparatus, wherein the optical pickup system includes a light source, a diffractive optical element that diffracts a light beam incident from the light source and splits the light beam into at least three beams, an optical path changer that changes a propagation path of the light beam, and a photodetector comprising at least one main photodetector and a plurality of sub-photodetectors and is provided so as to have a reflecting mirror redirect the propagation path of the light beam emitted from the light source toward a recording medium, the method comprising, where the propagation path of the light beam transmitted through the optical path changer to the photodetector is an optical path axis, arranging the optical pickup system so as to incline a bisector axis of the optical pickup system and a dividing line of the main photodetector in the same direction with respect to an axis in a tangential direction of the recording medium to detect a tracking error signal of the recording medium by a three-beam based method and by a DPD method, using the one photodetector.

* * * * *

UNITED STATES PATENT AND TRADEMARK OFFICE
CERTIFICATE OF CORRECTION

PATENT NO. : 7,092,325 B2
APPLICATION NO. : 10/460655
DATED : August 15, 2006
INVENTOR(S) : Bong-gi Kim et al.

It is certified that error appears in the above-identified patent and that said Letters Patent is hereby corrected as shown below:

Title Page item 54 and Column 1, Line 3 change "REPRODUCING" to --REPRODUCTING--.

Title Page Column 1 item 75 (Inventors), Line 6, change "Gyeonggid-do" to --Gyeonggi-do--.

Column 1, Line 3, change "REPRODUCING" to --REPRODUCTING--.

Signed and Sealed this

Thirtieth Day of January, 2007

JON W. DUDAS
*Director of the United States Patent and Trademark Office*